United States Patent Office 3,357,941
Patented Dec. 12, 1967

3,357,941
3-(N,4-DINITROSOANILINO)PROPIONITRILE AND PROCESS COMPRISING HEATING BUTYL RUBBER IN PRESENCE OF SAME
Ching C. Tung, Kirkwood, Mo., assignor to Monsanto Company, a corporation of Delaware
No Drawing. Filed Aug. 1, 1963, Ser. No. 299,190
3 Claims. (Cl. 260—41.5)

The present application is a continuation-in-part of application S.N. 511,422, filed May 26, 1955, and of application S.N. 6,358, filed Feb. 3, 1960, both abandoned.

The present invention relates to a process of improving the properties of rubber compositions and particularly butyl rubber compositions. More particularly, the invention relates to the heat processing of butyl rubber, to the vulcanizing of such treated butyl rubber and to the vulcanized butyl rubber so obtained.

Butyl rubber is the well recognized and commonly employed generic name applied to a variety of elastic copolymers of isobutylene and small quantities of diolefins. Although isoprene is preferred the invention may be practiced with copolymers of isobutylene and other dienes, as for example butadiene, hexadiene, dimethyl butadiene, piperylene, dimethallyl and cyclopentadiene. The diolefins are usually selected so to produce a final product which possesses only a small percentage of the unsaturation of natural rubber. The content of combined diolefin hydrocarbon is not greater than 15%. Due to this low unsaturation, butyl rubber is very stable and for the same reason is difficult to vulcanize. The vulcanization reaction is not only sluggish but the vulcanized products fail to possess the modulus of elasticity, resilience and resistance to flow required for many uses. These characteristics in the past have limited to a considerable extent the field of usefulness of butyl rubber. It has now been found possible to supply means and methods for improving the characteristics mentioned and thereby to enlarge the area of usefulness of the vulcanized product.

Other diene hydrocarbon rubbers including natural rubber, butadiene-styrene copolymer rubber, synthetic polybutadiene and synthetic polyisoprene rubber are improved by the present invention. These rubbers have better resilience to start with but the percentage improvement is comparable.

An object of the present invention is to improve the properties of diene elastomers and particularly of butyl rubber vulcanizates, to provide a means to increase the modulus of elasticity and otherwise to improve the physical properties of the vulcanizates. A further object of the invention is to provide a process for simplifying and shortening the heat treatment of butyl rubber as well as lowering the torsional hysteresis of the vulcanizates. A further object is to provide special chemical compounds which improve the properties of butyl rubber when heated with the rubber. A specific object is to promote the reaction between butyl rubber and carbon black or other pigments by means of the special catalysts.

It has been found in accordance with the present invention that 3-(N,4-dinitrosoanilino)propionitrile modifies the properties and promotes the heat treating of butyl rubber, with or without the presence of carbon black. Heating butyl rubber without curatives in the presence of a small amount of 3-(N,4-dinitrosoanilino)propionitrile effects a reaction which not only increases the modulus of elasticity of the vulcanizate markedly but also retains reasonable elongation. For promoting reaction with carbon black, the proportion of carbon black should be at least 25 parts per hundred parts of butyl rubber and preferably within the range of 25–60 parts of carbon black. The heating is desirably above 121° C. (250° F.) and preferably at 149–188° C. (300–370° F.) with heating times ranging from one minute to 16 hours. The compositions are masticated either during or after the heat treatment. If desired, additional dinitrosoamine may be added with the vulcanizing ingredients to the rubber reacted with 3-(N,4-dinitrosoanilino)propionitrile.

As one specific embodiment of the invention, a butyl rubber masterbatch comprising 100 parts of GR-I 17 butyl rubber, a copolymer of 97.5% isobutylene and 2.5% isoprene (1.5–1.9 mole percent unsaturation, molecular weight about 445,000), 15 parts of a high abrasion furnace black (Philblack O) and 35 parts of channel black (Kosmobile S–66) are prepared in duplicate, one with 0.5 part of 3-(N,4-dinitrosoanilino)propionitrile and one containing no additive. The batches are mixed in a Banbury for 10 minutes at 302° F. (150° C.). Thereupon, to each batch there is added on a mill at 122° F. (50° C.) 5 parts of zinc oxide, 2 parts of sulfur, 1 part of tetramethyl thiuram disulfide and 1 part of 2,2'-dithiobis benzothiazole and vulcanization of the respective batches is completed by heating in a press 45 minutes at 307° F. The physical properties are summarized in Table I.

TABLE I

| Additive | Modulus of elasticity in lbs./in.² at 300% elongation | Tensile at break in lbs./in.² | Ultimate elongation, percent | Torsional hysteresis |
|---|---|---|---|---|
| None | 1,380 | 2,890 | 540 | .415 |
| 3-(N,4-dinitrosoanilino)-propionitrile | 2,190 | 2,990 | 440 | .218 |
| 3-(N,4-dinitroso-3-methylanilino)propionitrile | 1,990 | 2,800 | 450 | .250 |

The torsional hysteresis is determined at room temperature with an apparatus which embodies a torsion pendulum. The sample of rubber tested supplies the force to restore the pendulum when it is deflected. The logarithmic decrement of the observed amplitude is recorded.

Another series of tests were completed in which the butyl rubber and 3-(N,4-dinitrosoanilino)propionitrile were heated together as described hereinafter, following which carbon black was added to the treated rubber and thereupon the balance of the ingredients were added and the mixes then vulcanized. In these tests 100 parts of butyl rubber (GR-I 17) were mixed for 3 minutes at a temperature of 302° F. in a Banbury mill with 0.5 part of 3-(N,4-dinitrosoanilino)propionitrile. Following this, a mixture of 15 parts furnace black (Philblack O) and 35 parts of channel black (Kosmobile S–66) are added in the Banbury and the whole mixed for 5 minutes at 302° F. Following this, the balance of the compounding ingredients comprising 5 parts of zinc oxide, 2 parts of sulfur, 1 part of tetramethyl thiuram disulfide and 1 part of 2,2'-dithiobis benzothiazole are added to the mix on the differential rubber mill at a temperature of 122° F. Vulcanization is then completed in a press by heating for 45 minutes at 307° F. The results obtained are set forth below:

TABLE II

| Additive | Modulus of elasticity in lbs./in.² at 300% elongation | Tensile at break in lbs./in.² | Ultimate elongation, percent | Torsional hysteresis |
|---|---|---|---|---|
| None | 1,640 | 3,050 | 520 | .396 |
| 3-(N,4-dinitrosoanilino)-propionitrile | 2,340 | 3,180 | 400 | .188 |

If desired the carbon black can be added with the curatives on the mill. The results are similar.

Compared to less saturated rubber, butyl rubber requires higher accelerator levels to develop maximum properties in the vulcanized stocks. Although only one accelerator combination is set forth in the various examples, it is to be understood that other dithiocarbamates, thiuram sulfides and thiazole accelerators active with butyl rubber may be employed. In a like manner, the heating range for treatment of the butyl rubber, both in a black masterbatch and by itself, may be varied between rather wide limits, for example from about 50° C. up to about 175° C. Furthermore, the period of heat treatment is not limited to the actual times shown in the examples, as such periods may extend from 2 to 16 hours in the static treatments or from 1 to 30 minutes in the dynamic treatments. Under dynamic conditions the time of heat treatment may be very short.

For illustration of improving the more unsaturated diene polymer rubbers, 3-(N,4-dinitrosoanilino)propionitrile is added to styrene-butadiene copolymer rubber. The nitrile is added to a small portion of the rubber on a rubber mill at 50° C. This milled portion is then added to the remainder of the rubber in a Banbury. Mixing is started at slow speed and zinc oxide and stearic acid added. The ram is then closed and Banbury mixing is continued for one minute at third speed. The speed is then cut back to slow, one-half the carbon black is added, mixing is continued at third speed for another minute, and the rest of the carbon black is added as before. The Banbury is then swept down, the masterbatch mixed for three minutes at third speed, dumped and cooled. To a portion of the masterbatch on a rubber mill at 50° C. is added sulfur, accelerator and antidegradant and this milled portion is then added with the remainder of the masterbatch to the Banbury and the batch mixed for five minutes with full cooling. A duplicate masterbatch is prepared containing no additive. The completed formulations are as follows:

|  | Parts by weight | |
| --- | --- | --- |
| Stock | A | B |
| SB-R 1712* | 137.12 | 137.12 |
| 3-(N,4-dinitrosoanilino)propionitrile | | 0.33 |
| Zinc oxide | 3.0 | 3.0 |
| Stearic acid | 2.0 | 2.0 |
| Carbon black (Statex 125) | 60.0 | 60.0 |
| Antidegradant | 2.0 | 2.0 |
| Sulfur | 2.0 | 2.0 |
| Accelerator | 1.2 | 1.2 |

*High molecular weight oil extended styrene-butadiene copolymer rubber.

The stocks are cured in the usual manner by heating in a press for 40 minutes at 292° F. The physical properties are summarized below:

TABLE III

| Stock | Modulus of elasticity in lbs./in.$^2$ at 300% elongation | Tensile at break in lbs./in.$^2$ | Ultimate elongation, percent | Torsional hysteresis |
| --- | --- | --- | --- | --- |
| A | 1,600 | 3300 | 500 | .302 |
| B | 2,130 | 3100 | 390 | .263 |

Similar improvements are observed when carbon black is added to the promoter before addition to the styrene-butadiene copolymer and the masterbatch is thereafter prepared by the same procedure. The completed formulation corresponds to Stock B above. Vuulcanization is effected by heating in a press for 40 minutes at 292° F. The results are as folows:

TABLE IV

| | |
| --- | --- |
| Modulus of elasticity in lbs./in.$^2$ at elongation of 300% | 2120 |
| Tensile at break in lbs./in.$^2$ | 3000 |
| Ultimate elongation, percent | 380 |
| Torsional hysteresis | .270 |

As illustrative of the desirable properties imparted to natural rubber, an Hevea rubber masterbatch comprising 100 parts of rubber, 50 parts of a high abrasion furnace black (Philblack O), 3 parts of zinc oxide, 2 parts of stearic acid and 5 parts of a hydrocarbon oil softener is prepared in duplicate, one with 0.33 part of 3-(N,4-dinitrosoanilino)propionitrile or other additive as indicated and one containing no additive. The batches are mixed in a Banbury for 6 minutes at 302° F. whereupon to each batch is added on a mill at 122° F. 0.4 part of N-tert.-butyl-2-benzothiazolesulfenamide, 2.0 parts of sulfur and 2.0 parts of antidegradant. Vulcanization of the respective batches is completed by heating in a press for 30 minutes at 292° F. the physical properties are summarized in Table V.

TABLE V

| Additive | Modulus of elasticity in lbs./in.$^2$ at 300% elongation | Tensile at break in lbs./in.$^2$ | Ultimate elongation, percent | Torsional hysteresis |
| --- | --- | --- | --- | --- |
| None | 2,150 | 4,300 | 550 | 0.187 |
| 3-(N,4-dinitrosoanilino)propionitrile | 2,530 | 4,400 | 480 | 0.137 |
| 3-(3-chloro-N,4-dinitrosoanilino)propionitrile | 2,600 | 4,500 | 470 | 0.115 |
| 3-(3-bromo-N,4-dinitrosoanilino)propionitrile | 2,430 | 4,450 | 490 | 0.130 |
| 3-(N,4-dinitroso-3-ethylanilino)propionitrile | 2,350 | 4,500 | 500 | 0.155 |

3-(N,4-dinitrosoanilino)propionitrile may be prepared by Fischer-Hepp rearrangement of 3-(N-nitrosoanilino)-propionitrile followed by a second nitrosation. 3-(N-nitrosoanilino)propionitrile forms readily by nitrosating 3-anilinopropionitrile in aqueous alcohol mixture with hydrochloric acid. However, nitrosation of 3-anilinopropionitrile with sodium nitrite and anhydrous alcoholic hydrogen chloride is accompanied by alcoholysis and esterification yielding β-(p-nitrosoanilino)propionates. While the para rearrangement of the nitroso group in methyl and ethyl β-anilinopropionate catalyzed by hydrochloric acid-acetic acid takes place with concurrent hydrolysis of the ester function, 3-(N-nitrosoanilino)propionitrile is not hydrolyzed under these rearrangement conditions. The method of preparation is illustrated below:

To a stirred solution containing 92.0 grams (0.525 mole) of 3-(N-nitrosoanilino)propionitrile and 386 ml. of glacial acetic acid is added in one portion 154 ml. of concentrated hydrochloric acid. An exothermic reaction sets in causing a temperature rise from 21 to 39° C. over a 30-minute period. The stirred reaction mixture is maintained at 25–30° C. for 24 hours. The solid is collected by filtration and washed with 500 ml. of ethyl ether. After drying for 2 hours, the solid is added to 750 grams of ice water. To this stirred solution 43 grams of concentrated ammonium hydroxide is added dropwise at 0–10° C. The reaction mixture is stirred for an additional 15 minutes and filtered. The solid is washed with 300 ml. of cold water and air dried at room temperature. It is a green colored solid, M.P. 132–133° C. after recrystallization from ethyl alcohol.

*Analysis.*—Calcd. for $C_9H_9N_3O$: N, 5.18; C, 61.70; N, 23.99; mol. wt., 175.2. Found: H, 4.97; C, 61.85; N, 23.91; mol. wt., 172.7.

A solution is prepared by dissolving 35.1 grams (0.2 mole) of the 3-(p-nitrosoanilino)propionitrile so prepared in 24.3 grams of concentrated hydrochloric acid and 1000 grams of ice water. To this stirred solution at 0° C. is added dropwise at 0–5° C. 14.4 grams (0.203 mole) of 97% sodium nitrite dissolved in 60 ml. of water over a 15-minute period. To the resulting slurry 400 ml. of heptane is added and stirring is continued for 15 minutes. The solid is collected, washed with water until free of chloride and air dried at room temperature. 3-(N,4-dinitrosoanilino)propiontrile is obtained in 97.0% yield as a green solid melting at 84–85° C. after recrystallization from isopropyl alcohol. Analysis gave 27.31% nitrogen as compared to 27.44% calculated for $C_9H_8N_4O_2$.

Substituting the appropriate meta substituted anilinopropionitrile in the foregoing procedures yields other useful compounds as illustrated. Chlorine, bromine or lower alkyl groups in the meta-position of anilinopropionitrile interfere neither with the preparation of the required N,4-dinitroso derivatives nor their reactivity with elastomers. Similarly the phenyl radical may be replaced by naphthyl as in 3 - (N,4 - dinitroso-1-naphthylamino)propionitrile. These compounds are generally more expensive to prepare but some of them are more effective catalysts.

The catalysts may either be added to the massed rubber, to rubber in the form of latex or to a cement. In the case of isobutylene rubber the compound may be reacted with the rubber at the place of manufacture during the processing after polymerization. Where the reaction is carried out during formulation, at least one ingredient essential for vulcanization must be absent to obtain the advantages described. Preferably the reaction is carried out in the absence of both vulcanizing agent, usually sulfur, and accelerator although either but not both may be present.

The amount of catalyst will vary depending upon the particular stock and the results desired. Amounts within the range of 0.01 to 3.0 parts per 100 parts of rubber cover the useful range for most purposes. Optimum properties have been obtained with amounts within the range of 0.1–1.0 part.

The rubber treated with the new adjuvant resists prevulcanization. Compared to stocks heated without addition of the chemical, unvulcanized but vulcanizable stocks are equal or even more resistant to prevulcanization. The time required for incipient vulcanization is generally less than that of an untreated control. The resistance to scorch is an important attribute.

Silica, clay or other light colored pigments may be substituted for carbon black in practice of the invention.

The term "rubber" or "rubbery polymer" is used in its usual sense to mean a material which can be stretched repeatedly to at least twice its original length and upon release of the stress will return with force to its approximate original length. This long term reversible elasticity is a characteristic property of vulcanizable conjugated diene rubbery polymer with which the invention is particularly concerned. Mixtures of such rubber are also included. Natural rubber is commonly diluted with styrene-butadiene copolymer rubber, cis-polybutadiene rubber or cis-polyisoprene rubber and treatment of such mixtures in the manner described reduces internal friction of the vulcanizates.

It is intended to cover all changes and modifications of the examples of the invention herein chosen for purposes of disclosure which do not constitute departures from the spirit and scope of the invention.

What is claimed is:
1. Butyl rubber which is a copolymer of at least 85% isobutylene and a small amount, not more than 15% of conjugated diolefin hydrocarbon, reacted at a temperature within the range of 122° F.–370° F. for a time within the range of about one minute to sixteen hours, with 0.01–3.0 parts per 100 parts by weight of copolymer hydrocarbon of 3-(N,4-dinitrosoanilino)propionitrile.

2. The process which comprises heating within the range of 250° F.–370° F. for a time within the range of about one minute to sixteen hours butyl rubber which is a copolymer of at least 85% isobutylene and a small amount, not more than 15% of conjugated diolefin hydrocarbon, said rubber having incorporated therein carbon black within the range of 25–60 parts per 100 parts by weight of rubber and 3-(N,4-dinitrosoanilino)propionitrile within the range of 0.01–3.0 parts per 100 parts by weight of rubber in amount which increases the resilience of the vulcanizate prepared from the rubber treated as aforesaid, any vulcanizing ingredients, if present, being present in amounts insufficient to cause vulcanization.

3. 3-(N,4-dinitrosoanilino)propionitrile.

References Cited

UNITED STATES PATENTS 2,895,937  7/1959  Baldwin et al. _____ 260—85.3

FOREIGN PATENTS 565,821  8/1957  Italy.

OTHER REFERENCES

D'Amico et al.: Journal Am. Chem. Soc., vol. 81, Nov. 20, 1959, pp. 5957–5963 relied on.

JOSEPH L. SCHOFER, *Primary Examiner.*

E. J. SMITH, J. A. SEIDLECK, *Assistant Examiners.*